United States Patent [19]

Tokita et al.

[11] Patent Number: 5,198,960
[45] Date of Patent: Mar. 30, 1993

[54] COLOR CATHODE RAY TUBE SET

[75] Inventors: Kiyoshi Tokita, Fukaya; Kazunori Nakane, Fukiage; Masatsugu Inoue, Fukaya; Takeshi Fujiwara, Kumagaya, all of Japan

[73] Assignee: Kabushiki Kaisha Toshiba, Kawasaki, Japan

[21] Appl. No.: 311,862

[22] Filed: Feb. 17, 1989

[30] Foreign Application Priority Data

Feb. 18, 1988 [JP] Japan .................................. 63-33915

[51] Int. Cl.⁵ ........................ H01F 13/00; H04N 9/29
[52] U.S. Cl. ............................................ 361/150; 315/8
[58] Field of Search ...................... 361/149, 150, 267; 315/8; 307/101; 335/284

[56] References Cited

U.S. PATENT DOCUMENTS

| | | | |
|---|---|---|---|
| 3,439,211 | 4/1969 | Cassagne et al. | 315/8 |
| 4,295,078 | 10/1981 | Wilmarth | 315/8 |
| 4,384,313 | 5/1983 | Steingrover et al. | 361/149 |
| 4,441,052 | 4/1984 | Willis | 315/8 |
| 4,458,178 | 7/1984 | Tenney et al. | 315/8 |
| 4,535,270 | 8/1985 | Frantz et al. | 315/8.0 |
| 4,737,881 | 4/1988 | Haferl | 361/150 |

FOREIGN PATENT DOCUMENTS

| | | |
|---|---|---|
| 1905977 | 9/1969 | Fed. Rep. of Germany . |
| 58-31689 | 2/1983 | Japan . |
| 58-714 | 7/1983 | Japan . |

OTHER PUBLICATIONS

Fink, Television Engineering Handbook, First edition, McGraw-Hill Book Company, Inc., 1957, pp. I-8-I-11.

Primary Examiner—A. D. Pellinen
Assistant Examiner—David Osborn
Attorney, Agent, or Firm—Cushman, Darby & Cushman

[57] ABSTRACT

A degaussing current whose frequency is L Hz is supplied to a degaussing apparatus, and a constant amplitude vertical deflection current whose frequency is M Hz is supplied to a deflection yoke. The degaussing current is an A.C. current, and its frequency L Hz is determined such that the value of M/L is not an integer.

16 Claims, 7 Drawing Sheets

COLOR CATHODE RAY TUBE SET

BACKGROUND OF THE INVENTION

1. Field of the Invention

The present invention relates to a color cathode ray tube set, and more particularly to a degaussing method and apparatus for a shadow mask type color cathode ray tube set.

2. Description of the Related Art

In general, a color cathode ray tube of a shadow mask type comprises a panel section including a substantially rectangular faceplate and a skirt extending from the peripheral portion of the faceplate; a funnel section connected to the panel; and a neck section continuous to the funnel. By these three sections, the interior of the cathode ray tube is hermetically sealed. An electron gun assembly for emitting electron beams is arranged inside the neck. A deflection yoke for generating a magnetic field is provided on the outer surface of the funnel and neck, and a degaussing coil for degaussing a magnetized member is provided on the outer surface of the funnel. A phosphor screen is formed on the inner surface of the faceplate of the panel. A substantially rectangular shadow mask is arranged inside the tube such that it faces the faceplate, with a predetermined distance maintained. The shadow mask is made of a thin metal plate having a large number of slit apertures. A mask frame, having a plurality of elastically deformable mask support members welded thereto, is provided around the shadow mask. A plurality of stud pins, which are engaged with the respective mask support members, are arranged on the inner surface of the panel. An internal magnetic shield is provided on that side of the mask frame which faces the neck, so as to prevent the electron beams emitted from the electron gun assembly from being affected by magnetic fields of earth magnetism et al.

In the color cathode ray tube having the above construction, the three electron beams emitted from the electron gun assembly are deflected both horizontally and vertically, due to the magnetic field generated by the deflection yoke, and are then converged toward the respective slit apertures of the shadow mask. After converging in the vicinity of the slit apertures, the electron beams land on the phosphor screen formed on the panel. The phosphor screen has three kinds of phosphor stripes arranged alternately. These phosphor stripes emit red, green and blue light rays, respectively, when the electron beams passing through the slit apertures of the shadow mask are incident thereon. That is, the slit apertures of the shadow mask serve to direct the three kinds of electron beams to the red-, green-, and blue-color producing phosphor stripes, respectively.

Normally, the shadow mask, mask frame, internal magnetic shield and other members of a color cathode ray tube set are formed of a magnetic material, such as low carbon steel. Therefore, if they become magnetized due to magnetic field of the earth magnetism et al, their remnant magnetism may shift the paths of electron beams. If the paths of electron beams are shifted, the electron beams do not land accurately on the phosphor screen, with the result that the color purity of the color cathode ray tube apparatus deteriorates. To avoid this deterioration, the magnetized members have to be demagnetized to erase the remnant magnetism therefrom.

Conventionally, the magnetized members of a color cathode ray tube set are degaussed by means of a degaussing coil wound around the outer wall of the funnel of the tube. Degaussing is normally carried out in the following three cases:

(1) The first degaussing is effected in the manufacturing process of a color cathode ray tube, so as to test the characteristics of a color cathode ray tube which has been manufactured.

(2) The second degaussing is effected in the manufacturing process of a TV set, so as to test the characteristics of a TV set into which the color cathode ray tube and other components have been incorporated.

(3) The third degaussing is effected every time the TV set is switched on.

In the test of the characteristics of the color cathode ray tube, the color purity is measured for the evaluation of the picture quality. This measurement is performed after remnant magnetism is erased by use of the degaussing method mentioned later.

The color cathode ray tube assembled in the TV set is demagnetized to erase the remnant magnetism for controlling the color purity when the TV set is adjusted.

A conventional degaussing method will be described. The electron beams emitted from an electron gun assembly are deflected by the vertical and horizontal deflection coil of the deflection yoke driven by a vertical and horizontal deflection current. To erase the remnant magnetism from magnetic members, a transient, attenuating A.C. current (i.e., an A.C. current which gradually attenuates with time) is supplied to the degaussing coil while or after the phosphor screen is scanned with the electron beams. The frequency of the A.C. current is the same as the commercial frequency, and the frequency of the vertical deflection current is also the same as the commercial frequency in most regions in the world. FIG. 1 shows how degaussing magnetic field 2 generated by the transient, attenuating A.C. current and deflection magnetic field 4 generated by the vertical deflection current change with time. As is shown in FIG. 1, degaussing magnetic field 2 and deflection magnetic field 4 have the same frequency. Degaussing magnetic field 2 is shown as being in phase with deflection magnetic field 4, but normally, degaussing magnetic field 2 is not generated in synchronism with deflection magnetic field 4. Therefore, when degaussing magnetic field 2 is applied for the degaussing of the color cathode ray tube, a phase shift is likely to occur between degaussing magnetic field 2 and deflection magnetic field 4. FIG. 2 shows magnetic flux density distribution 6 relating to the vertical deflection magnetic field generated when the deflection coil is supplied with a vertical deflection current. In FIG. 2, magnetic flux densities are plotted against the ordinate and distances measured from the neck are plotted against the abscissa. As is indicated by magnetic flux density distribution 6, the magnetic flux density is as high as 5 gausses even at position 8 where the end of the magnetic shield is located. Since, therefore, the degaussing magnetic field and the vertical deflection magnetic field are superimposed on each other in the location of the magnetic shield, a hysteresis loop of a magnetic member applied with both degaussing magnetic field 2 and deflection magnetic field 4 is not symmetric with reference to the origin, and the magnetic shield retains the magnetism arising from the above-mentioned phase shift, even after it is degaussed. FIG. 3 shows hysteresis loop 10 of the magnetic shield. As is shown, hysteresis loop 10 of a magnetic member applied with both degaussing magnetic field 2 and deflection magnetic field 4 is transformed or shifted from normal hysteresis loop 12, which is indicated by the broken lines with the reference numeral of "12". Although, in FIG. 3, hysteresis loop 12 is rotation-symmetric with reference to the origin, hysteresis loop 10 is not. FIG. 4 shows a detailed hysteresis curve obtained when a magnetic material is degaussed by applying a degaussing magnetic field thereto. FIG. 5 shows a degaussing magnetic field generated when a degaussing current flows through the degaussing coil, and also shows a vertical deflection magnetic field generated when a vertical deflection current flows through the deflection yoke. The magnetic flux density and magnetic field strength at time a in FIG. 5 are indicated at point a in FIG. 4, and those at time c in FIG. 5 are indicated at point c in FIG. 4. Likewise, times b and d-h in FIG. 5 correspond to points b and d-h, respectively.

Otherwise, the magnetic flux density and the magnetic field strength at time a in FIG. 5 are indicated at point a' in FIG. 4 when the deflection yoke does not generate a vertical deflection magnetic field. Those at time c in FIG. 5 are indicated at point c' in FIG. 4 when the yoke does not generate the magnetic field. Likewise, times e, g in FIG. 5 correspond to points e', g', and times b, d, f and h in FIG. 5 correspond to proximate points (not shown) of points b, d, f and h respectively when the yoke does not generate the magnetic field. As a result, the hysteresis curve in FIG. 4 is shifted from a hysteresis curve (not shown) in the case of the magnetic shield applied with only degaussing magnetic field. Shift distance between point c and point c' is shorter than shift distance between point a and point a'.

Therefore, when the magnetic shield is applied with both degaussing magnetic field 21 and vertical deflection magnetic field 22, its hysteresis curve 20 can be represented in the manner indicated in FIG. 4. Accordingly, magnetic field strength Hb at time b is greater than magnetic field strength Hd at time d since magnetic shield is applied with vertical deflection magnetic field 22. The decrease quantity ΔHd of magnetic field strength Hd is greater than the decrease quantity ΔHb of magnetic field strength Hb. Therefore, hysteresis curve 20 is formed asymmetrically shown in FIG. 4. Moreover, the asymmetrical hysteresis curve is shifted in one direction during this degaussing since vertical deflection magnetic field 22 at points a, b, c and d in FIG. 5 are equal to magnetic field 22 at points e, f, g and h respectively. As a result of this degaussing, the hysteresis curve converges at point r in FIG. 4, and the remnant magnetism at converging point r is Br. In short, the remnant magnetism does not decrease to 0. Since converging point r moves due to the phase difference between the degaussing magnetic field and the vertical deflection magnetic field, remnant magnetism Br varies accordingly.

FIG. 6 shows how the landing point of an electron beam is shifted from its initial landing point on the phosphor screen corner, wherein the initial landing point is obtained when the color cathode ray tube is degaussed at the first time by using the above-described degaussing method, and the other landing point is obtained when the color cathode ray tube is also degaussed at the other time. In FIG. 6, the ordinate represents the distance between the initial landing point and the other landing point, while the abscisa represents how many times the degaussing method has been used. As can be understood from FIG. 6, the maximum shift distance is 33 μm and the average shift distance is 11 μm. Since as noted above, the remnant magnetism varies in accordance with the phase difference between the degaussing magnetic field and the vertical deflection magnetic field, therefore the distance through which the landing point is shifted varies in accordance with the phase difference.

In an embodiment of U.S. Pat. No. 4,737,881, a resonance circuit is used for degaussing a magnetized member. The resonance circuit comprises capacitor which has several micro farads of capacitance C and coil which has several millihenries of inductance I. According to $f = \frac{1}{2}\pi\sqrt{IC}$, the degaussing frequency f in the circuit is several ten kHz. The degaussing energy E is shown in $E \propto 2\pi\sqrt{IC} = 1/f$. The energy E is inversely proportional to the frequency. Therefore, the energy E is smaller as the degaussing frequency is higher. As a result, the magnetized member is not completely degaussed by the degaussing apparatus when degaussing frequency is very high.

Although a resonance circuit which oscillates under 100 Hz frequency is well known, such a circuit has to use a capacitor which has several farads of capacitance C and a coil which has several henries of inductance I. Therefore, the size of the circuit is larger than the size of a color cathode ray tube set. Moreover, the cost of the circuit is at least ten times greater than that of the set. Hence, it is impractical to use the circuit in the set.

If the set comprises the resonance circuit which oscillates at a frequency of several tens of kHz, the degaussing frequency is much higher than that of a vertical deflection magnetic field. Since the degaussing energy in the circuit is small and the magnetized member is affected by the field, the member is therefore not completely degaussed by the degaussing apparatus.

SUMMARY OF THE INVENTION

Accordingly, an object of the present invention is to provide a color cathode ray tube set which has excellent color purity and is highly suitable for mass production, as well as to provide a degaussing method and an apparatus for degaussing the color cathode ray tube set.

To achieve this object, the color cathode ray tube set of the invention comprises a vacuum envelope having a panel, a funnel, a neck, and a tube axis. The panel comprises: a faceplate whose front shape is substantially rectangular and which has an inner surface; and a skirt extending from the peripheral portion of the faceplate. The funnel is coupled to the skirt. The neck is substantially cylindrical and is continuous to the funnel. A phosphor screen is formed on the inner surface of the faceplate. A shadow mask is arranged in the panel such that it faces the phosphor screen. A deflection yoke, used for generating a deflecting magnetic field, is provided on the vacuum envelope. A vertical deflection current whose frequency is M (Hz) is supplied to the vertical deflection coil of the deflection yoke, the frequency M being substantially an integer. A degaussing coil for generating a degaussing magnetic field is provided around the outer surface of at least one of the funnel and the panel. This degaussing coil is supplied with a degaussing current whose frequency is L (Hz), and the value of L is determined such that the value of M/L is not an integer.

According to the present invention, the degaussing method for degaussing a color cathode ray tube comprises the two steps below which are executed at the same time:

a step of supplying a deflection current of frequency M Hz to the vertical deflection coil of the deflection yoke; and a step of supplying a degaussing signal of frequency L Hz, and the value of L being determined such that the value of M/L is not an integer, to the degaussing coil.

By use of the degaussing method comprising the above two steps, the remnant magnetism can be satisfactorily erased from the magnetic members of the color cathode ray tube.

DETAILED DESCRIPTION OF THE PREFERRED EMBODIMENTS

An embodiment of the present invention will now be described, with reference to the accompanying drawings.

Figure 1:
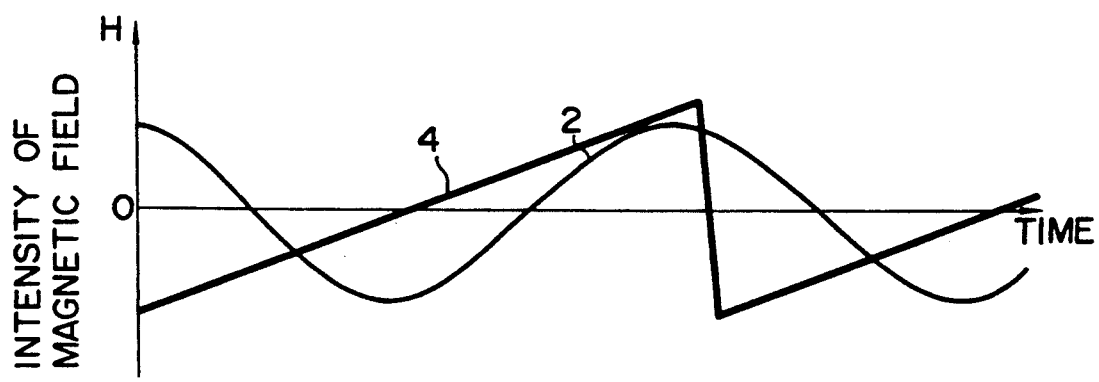
FIG. 1 is a graph showing how the degaussing magnetic field and the vertical deflection magnetic field are generated in a conventional color cathode ray tube set.
Figure 2:
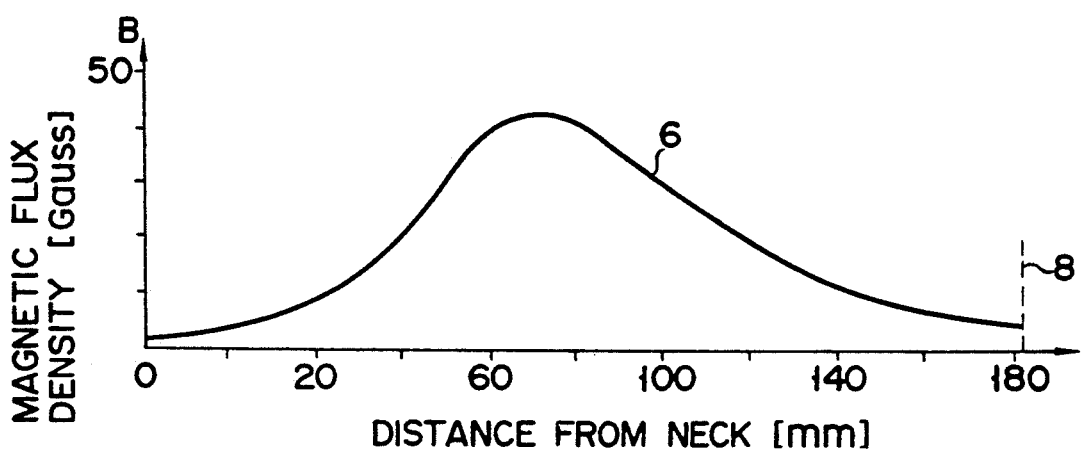
FIG. 2 is a graph showing how magnetic flux density of a vertical deflection magnetic field are distributed in the conventional color cathode ray tube set.
Figure 3:
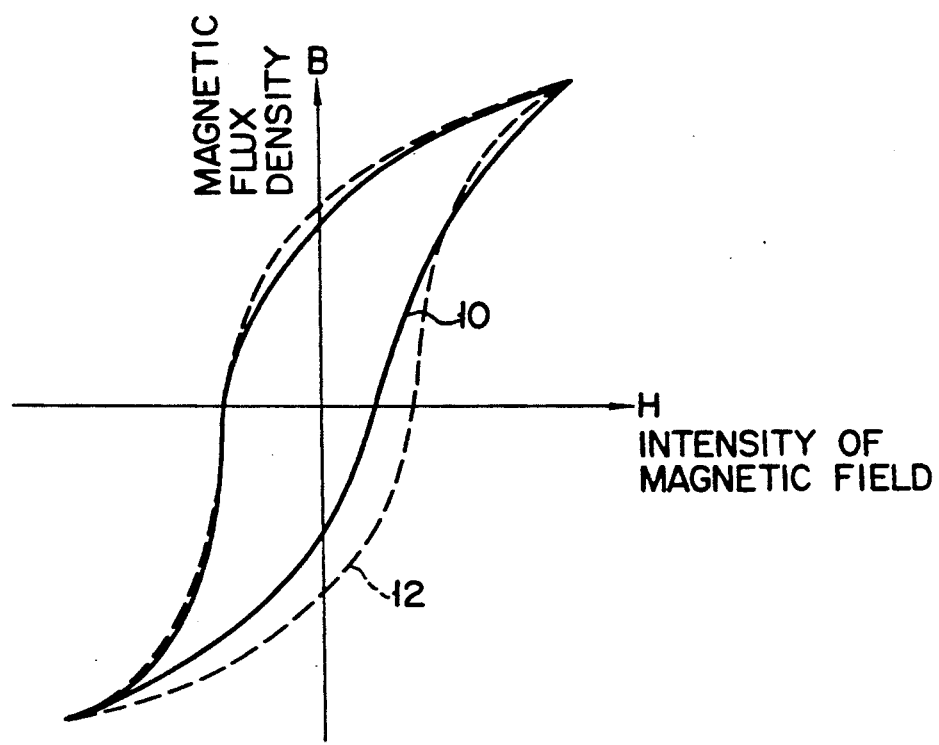
FIG. 3 shows a hysteresis loop relating to a conventional internal magnetic shield.
Figure 4:
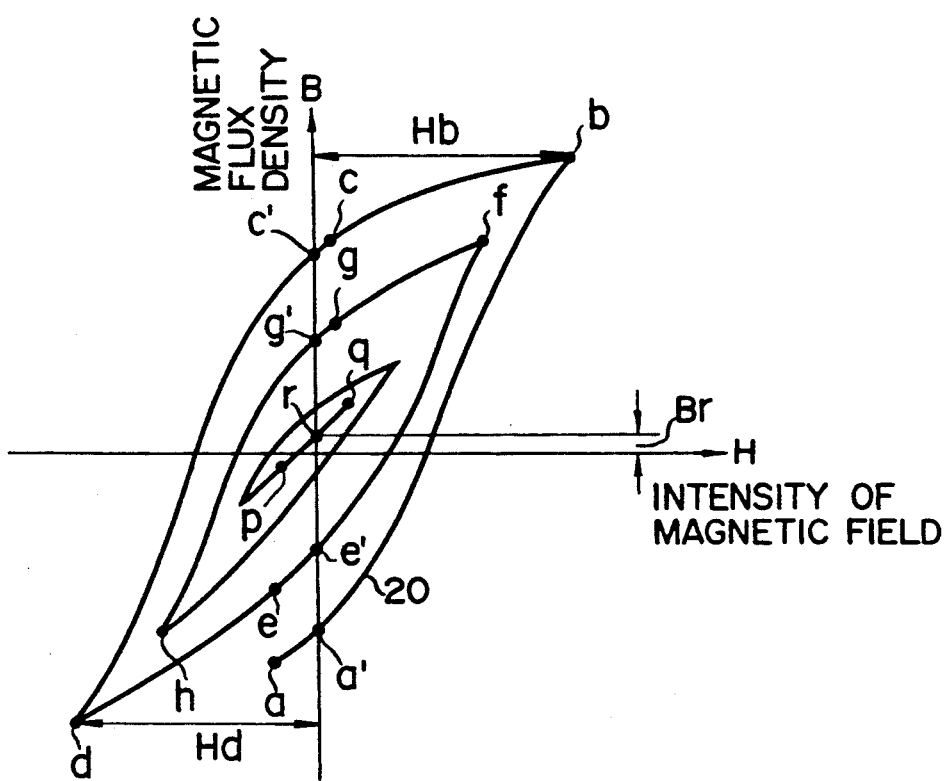
FIG. 4 shows a hysteresis curve obtained when the conventional color cathode ray tube set is degaussed by use of a conventional method.
Figure 5:
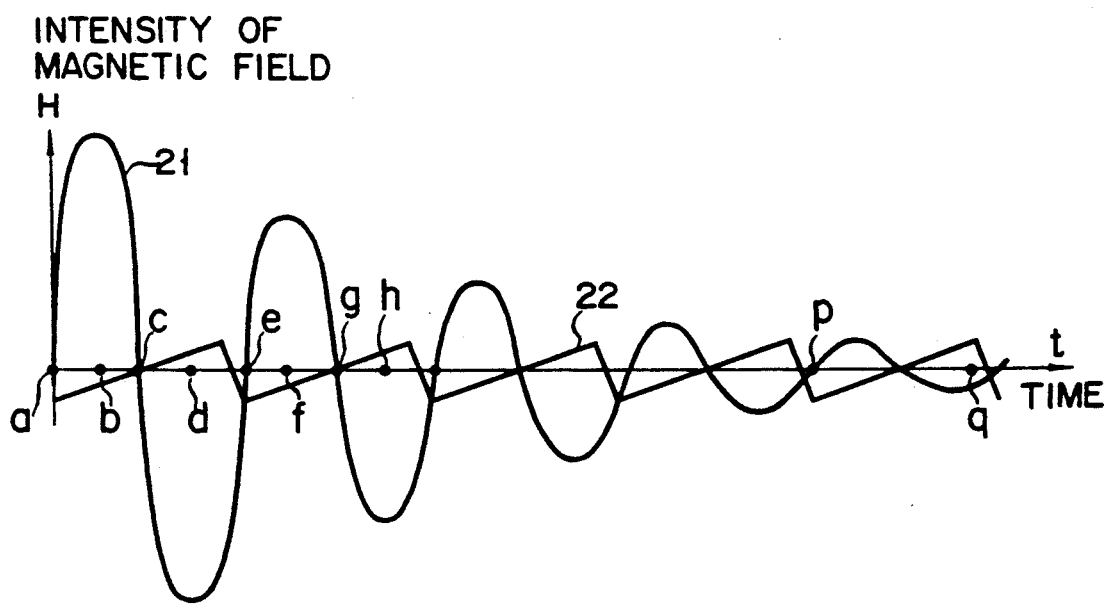
FIG. 5 is a graph showing both the degaussing magnetic field and the vertical deflection magnetic field of the conventional color cathode ray tube set.
Figure 6:
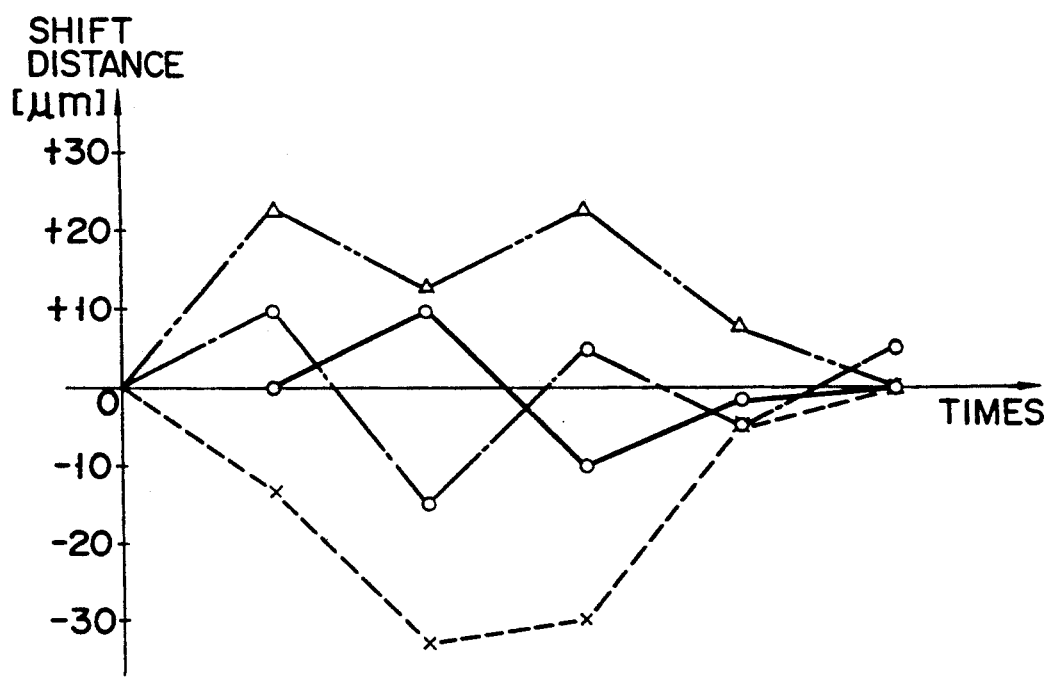
FIG. 6 shows how the landing point of an electron beam is shifted from its initial landing position in the conventional color cathode ray tube.
Figure 7:
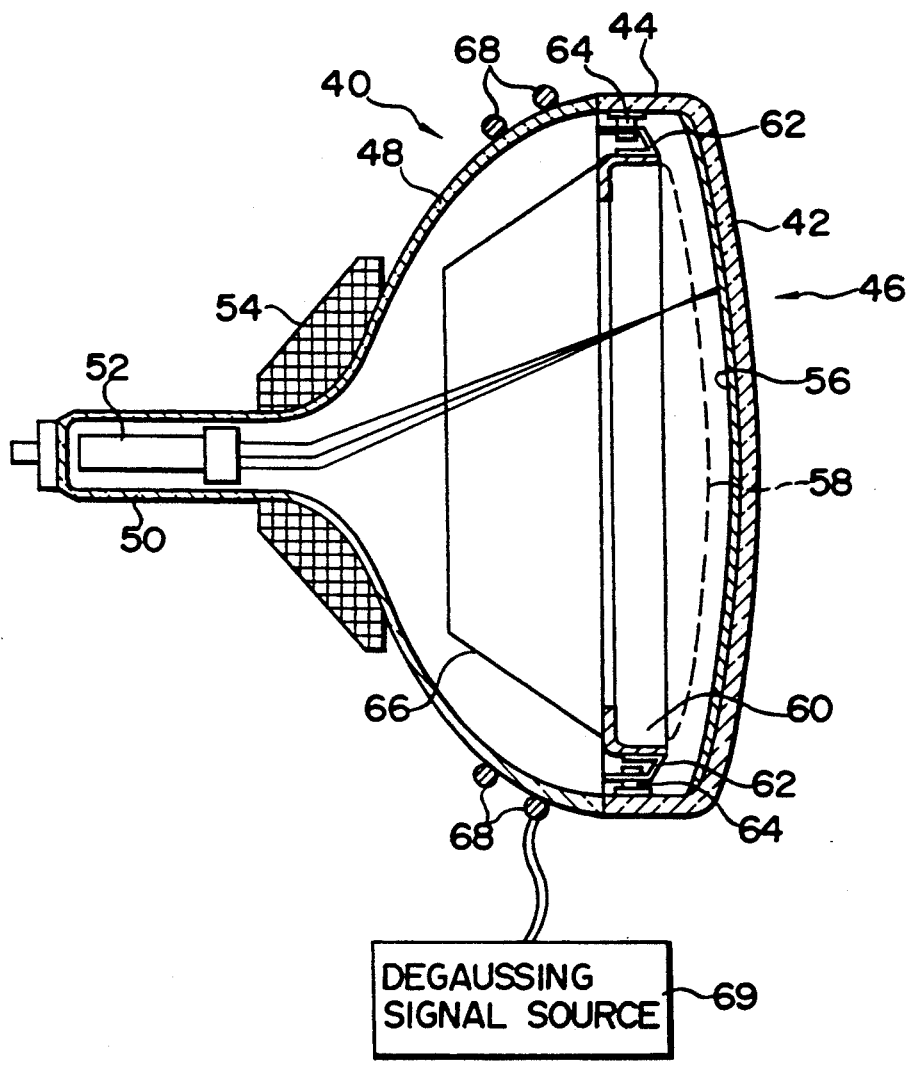
FIG. 7 is a longitudinal section of a color cathode ray tube set according to one embodiment of the present invention.
Figure 8:
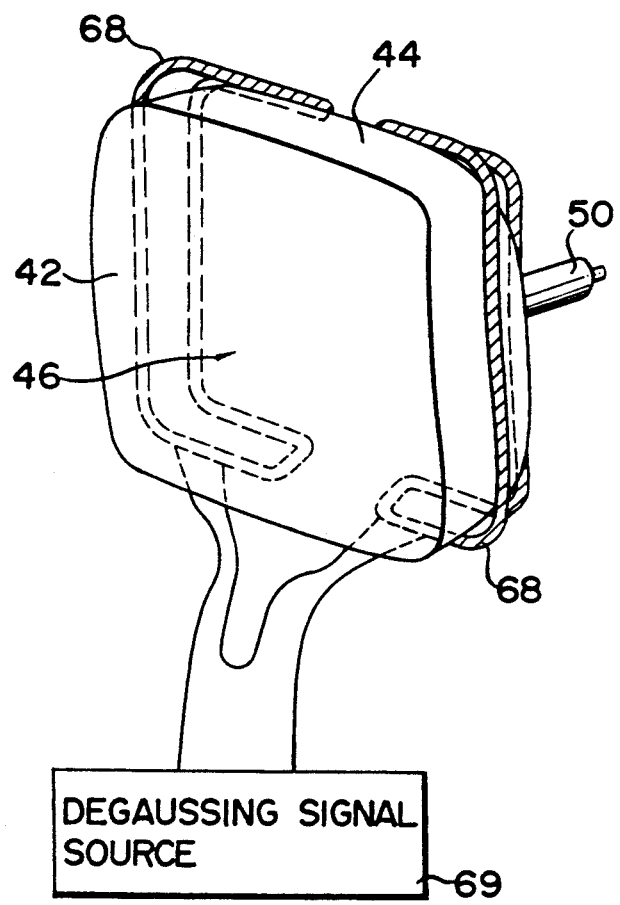
FIG. 8 is a perspective view of the degaussing apparatus used in the embodiment.

FIG. 7 shows color cathode ray tube set 40 of the embodiment. As is shown, set 40 is comprised of three sections: panel 46 having substantially rectangular faceplate 42 and skirt 44 extending from the peripheral portion of faceplate 42; funnel 48 coupled to skirt 44 of panel 46; and neck 50 continuous with funnel 48. By these three sections, the interior of the color cathode ray tube is closed airtight and kept under vacuum. Electron gun assembly 52 for emitting three electron beams is arranged inside neck 50. Deflection yoke 54, used for generating a deflecting magnetic field, is arranged around the outer surface of funnel 48 and neck 50. Degaussing coil 68 for generating a degaussing magnetic field is provided around the outer surface of funnel 48. Degaussing signal source 69 for producing a degaussing signal is connected to degaussing coil 68. Degaussing coil 68 and degaussing signal source 69 constitutes the degaussing apparatus shown in FIG. 8. Phosphor screen 56 is formed on the inner side of faceplate 42 of panel 46. Phosphor screen 56 has three types of phosphor layers arranged alternately in a stripe pattern. The three types of phosphor layers emit red, green and blue light rays, respectively, when the three electron beams emitted by electron gun assembly 52 are incident thereon. Rectangular shadow mask 58 is arranged inside the tube in such a manner as to face phosphor screen 56. Shadow mask 58 is made of a thin metal plate having a large number of slit apertures formed therein, and permits the three electron beams emitted from electron gun assembly 52 to land on their respective phosphor layers. Mask frame 60 is made of metal and is provided around the periphery of shadow mask 58. A plurality of elastically deformable support members 62 are welded to mask frame 60, and a plurality of panel pins 64 engageable with support members 62 are attached to the inner side of skirt 44. Internal magnetic shield 66 is provided on that side of frame 60 which is located closer to neck 50, such that the electron beams emitted from electron gun assembly 52 are not under the influence of extrinsic magnetic fields, for example the earth magnetism.

Figure 9:
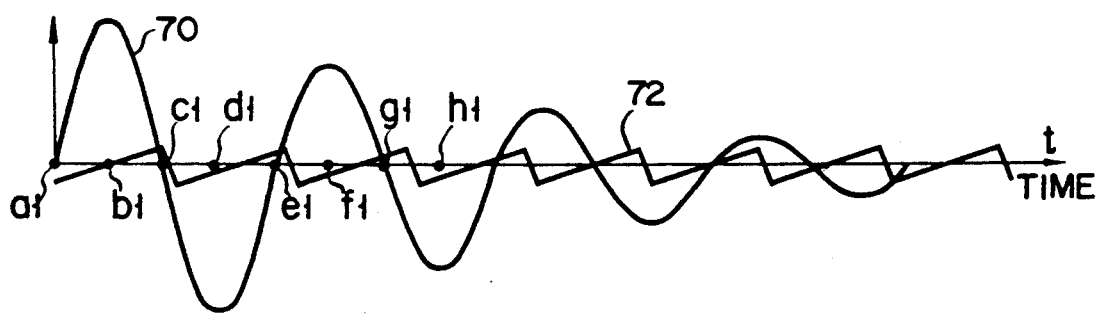
FIG. 9 is a graph showing both the degaussing magnetic field and the vertical deflection magnetic field generated in the set of the embodiment.
Figure 10:
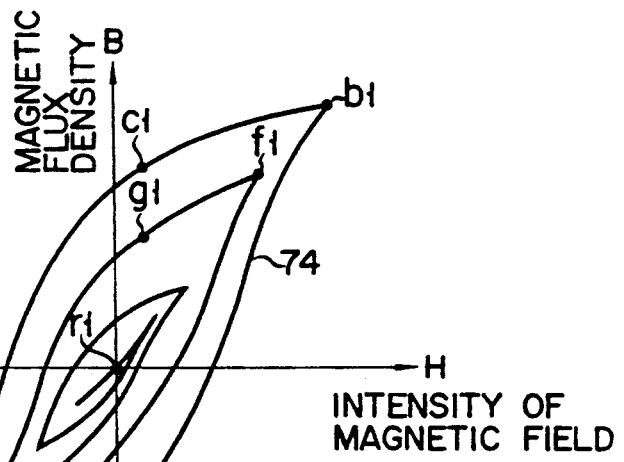
FIG. 10 shows a hysteresis curve obtained when the color cathode ray tube set of the embodiment is degaussed.

The degaussing method used in the present invention will now be described. When the color cathode ray tube set is switched on, the three electron beams emitted from electron gun assembly 52 are deflected by the vertical and horizontal magnetic fields generated by deflection coil 54, and phosphor screen 56 is scanned with the deflected electron beams. When the set has just been switched on or when it is in the on state, a gradually attenuating A.C. current is supplied from degaussing signal source 69 to degaussing coil 68. FIG. 9 shows the waveform of the magnetic field generated by the A.C. current supplied to degaussing coil 68, as well as the waveform of the vertical deflection magnetic field generated by the vertical deflection current supplied to deflection coil 54. As is shown, the frequency of magnetic field 70 generated by the A.C. current differs from that of magnetic field 72 generated by the vertical deflection current. FIG. 10 shows a hysteresis curve obtained when the two magnetic fields shown in FIG. 9 are applied to internal magnetic shield 66. In FIGS. 9 and 10, $a_1$, $b_1$, $c_1$ and $d_1$ indicate the starting point, ¼ point, ½ point and ¾ point, respectively, of the first period of the waveform of magnetic field 70; likewise, $e_1$, $f_1$, $g_1$ and $h_1$ indicate the starting point, ¼ point, ½ point and ¾ point, respectively, of the second period of the waveform of magnetic field 70. Intensity of vertical deflection magnetic field 72 at times $a_1$, $b_1$, $c_1$, $d_1$ in the first period of the waveform of magnetic field 70 is different from the intensity of field 72 at times $e_1$, $f_1$, $g_1$, $h_1$ in the second period of the waveform of field 70, respectively. Similarly, the intensity of field 72 in the second period of the waveform of field 70 is different from intensity of field 72 in the third period of the waveform of field 70. Therefore, the hysteresis curve of magnetic shield 66 applied with both degaussing magnetic field 70 and deflection magnetic field 72 is shifted and its shift quantity is changed in each period of the waveform of field 70. The shift quantity of the hysteresis curve in each period of the waveform of field 70 is decreased during degaussing the shield 66. As a result, the hysteresis curve varies at each period of the degaussing magnetic field and converges at point $r_1$ at which the remnant magnetism is zero.

Figure 11:
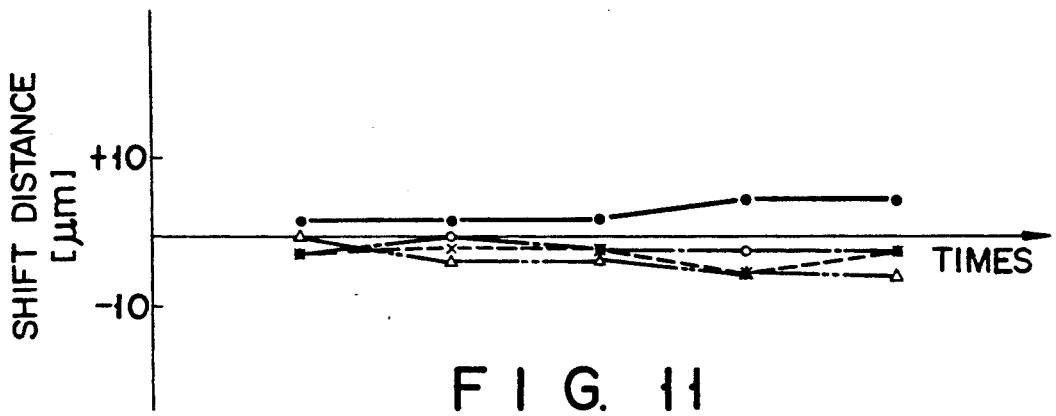
FIG. 11 is a graph showing how the landing point of an electron beam is shifted from its initial landing point after the degaussing method according to the present invention is used to degauss the set of the embodiment.

To confirm the advantages of the degaussing method of the present invention, a vertical deflection current whose frequency M was 60 Hz and a transient, attenuating A.C. current whose frequency L was 50 Hz were supplied to the deflection coil and degaussing coil, respectively, of a 30-inch, 110 degree-deflection color cathode ray tube set, and the distance for which the landing point of an electron beam was shifted from its initial landing point was measured in the vicinity of a corner of phosphor screen 56. Results of the measurement are shown in FIG. 11. The initial landing point is obtained when the set is degaussed at the first time, and the other landing point is obtained when the set is also degaussed at the other time. In FIG. 11, the ordinate represents the distance between the initial landing point and the other landing point, while the abscisa represents how many times the set has been degaussed. As can be understood from FIG. 11, the maximum and average shift distances of the landing point were 5 μm and 3 μm, respectively. Therefore, mislanding of an electron beam could be remarkably suppressed in comparison with the case where the conventional method wherein frequencies M and L were equal to each other was used for degaussing. Further, a vertical deflection current whose frequency M was 50 Hz and a transient, attenuating A.C. current whose frequency L was 60 Hz were supplied to the deflection coil and degaussing coil, respectively, and the shift distance of the landing point of an electron beam was measured in the vicinity of a corner of phosphor screen 56. In this case, the maximum and average shift distances of the landing point were 17 μm and 6 μm, respectively. Therefore, mislanding of an electron beam could be remarkably suppressed in this case as well. The results in the above two cases show that a magnetic member, such as the internal magnetic field, can be remarkably degaussed in the present invention.

Those skilled in the art will appreciate that the actual frequency M (e.g., for NTSC systems M=59.94) can be rounded to the nearest integer (e.g., M=60 Hz for NTSC) for purposes of discussion herein, so that the frequency M is considered as being substantially an integer.

If frequency M of the vertical deflection current is higher than frequency L of the degaussing current in the above specific examples (i.e., the case where M>L), the movement of the magnetic domain of a magnetic member easily follows the direction of the magnetic field generated by the degaussing current. Therefore, it can be erased easily. However, if the value of M/L is larger than 100 (i.e., M/L>100), the characteristics of the current flowing through the degaussing coil resemble those of a D.C. current, rather than those of an A.C. current, with the result that the degaussing is difficult to perform. Conversely, if frequency M of the vertical deflection current is lower than frequency L of the degaussing current (i.e., the case where M<L), the movement of the magnetic domain does not easily follow the direction of the magnetic field generated by the degaussing current. Therefore, the remnant magnetism is more or less difficult to erase, in comparison with the case of M>L. In consideration of these points, a range for satisfactory degaussing is determined as below in the present invention:

$$0.1 < M/L < 100$$

where M is not an integral multiple of L.

Figure 12:
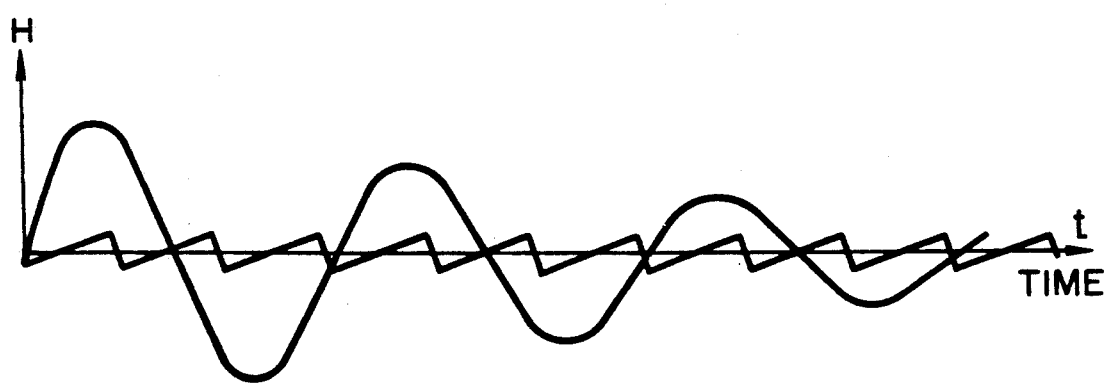
FIG. 12 is a graph showing both the vertical deflection magnetic field and the degaussing magnetic field generated such that frequency M of the former magnetic field and frequency L of the latter magnetic field satisfies the equation M/L=3.

If M is an integral multiple of L (i.e., where M/L is an integer), the magnetic field applied to a magnetic member has a certain pattern, thus making it difficult to completely erase the remnant magnetism. As a result, an electron beam is apt to land on the phosphor screen at a point shifted from the initial point. For example, if frequency M of the deflection magnetic field generated by a vertical deflection current is twice as high as frequency L of the degaussing magnetic field generated by a degaussing current (i.e., the case where M/L=2), then a half of the period of the degaussing current is equal to the period of the deflection current, so that the magnetic field applied to a magnetic member has a certain pattern. Due to this pattern, magnetism remains in the magnetic member even after application of the degaussing magnetic field. By way of another example, let it be assumed that frequency M of the deflection magnetic field generated by a vertical deflection current is three times as high as frequency L of the degaussing magnetic field generated by a degaussing current (i.e., the case where M/L=3), as is shown in FIG. 12. In this case, ⅓ of the period of the degaussing current is equal to the period of the deflection current, so that the magnetic field applied to a magnetic member has a certain pattern. Due to this pattern, magnetism remains in the magnetic member even after application of the degaussing magnetic field.

As can be understood from the above, remnant magnetism can be remarkably erased from a magnetic member when $0.1 \leq M/L < 100$ is satisfied and when the value of M/L is not an integer.

Figure 13A:
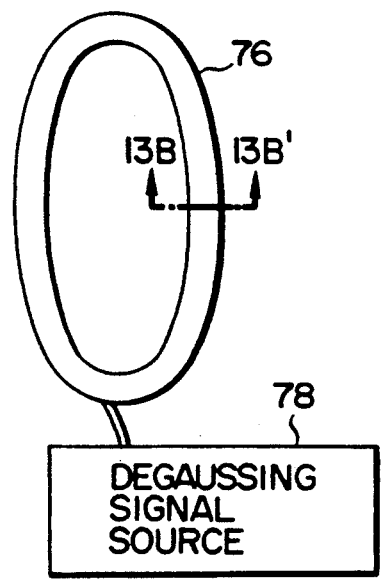
FIG. 13A is a plan view of a degaussing apparatus used in the embodiment.
Figure 13B:
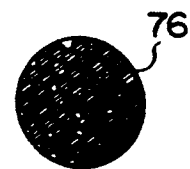
FIG. 13B is a sectional view taken along line 13B—13B' of FIG. 13A.

In the above embodiment, the degaussing coil is provided around the outer surface of the funnel, but the degaussing coil may be located around the panel or the panel and the funnel. Moreover, where degaussing is effected in the process of manufacturing a color cathode ray tube or a TV set, a degaussing apparatus shown in FIG. 13A and FIG. 13B are employed. This degaussing apparatus comprises degaussing coil 76 and degaussing signal source 78, as in the above embodiment. To degauss a color cathode ray tube, degaussing coil 76 is placed near the tube, and is moved away from it when an A.C. degaussing signal is supplied from degaussing signal source 78 to degaussing coil 76. By this procedure, the magnetized members of the color cathode ray tube can be degaussed.

In the above description of the embodiment, the degaussing method was explained, with reference to a color cathode ray tube having an internal magnetic shield and a shadow mask. Needless to say, however, the degaussing method can be used for a color cathode ray tube set comprising no internal magnetic shield. Moreover, the degaussing method can be applied not only to a color cathode ray tube set but to any type of picture tube in which a magnetic material is used in a region where a deflection magnetic field is to be applied.

According to the present invention, mislanding of an electron beam due to remnant magnetism can be suppressed. Therefore, in the picture quality evaluation test involved in the manufacturing process of a color cathode ray tube set, the mislanding of an electron beam (i.e., a distance for which the landing point of the electron beam is shifted from its initial landing point) can be measured accurately without the influence of remnant magnetism. As a result, the picture quality of the color cathode ray tube set can be judged accurately.

Further, since the remnant magnetism can be sufficiently erased from the color cathode ray tube set, the color purity of the color cathode ray tube set can be improved. As a result, the color cathode ray tube set provided by the present invention has satisfactory quality.

What is claimed is:

1. A method of degaussing a color cathode ray tube provided with a deflection yoke by using a degaussing coil, the tube comprising a vacuum envelope including a panel, a funnel, a neck and having a tube axis, and a shadow mask facing the panel, the deflection yoke being provided on the vacuum envelope for deflecting an electron beam, said method comprising the steps of:
   supplying the deflection yoke with a vertical deflection current having a constant amplitude and whose frequency is constant at M Hz, M being substantially an integer; and
   supplying the degaussing coil with a degaussing signal whose frequency is constant at L Hz, simultaneously with supplying of the vertical deflection current, said M and L being determined to effectuate said degaussing such that M/L is substantially not an integer, said degaussing signal being an alternating current, said degaussing signal being simultaneously supplied even when said vertical deflection current is not substantially zero.

2. A method according to claim 1, wherein said degaussing coil is located around an outer surface of at least one of the funnel and the panel, said degaussing coil being supplied with said degaussing signal, said degaussing signal being an alternating current which attenuates gradually.

3. A method according to claim 1, wherein said degaussing coil is moved away from a region close to the color cathode ray tube when the degaussing signal is supplied to the degaussing coil.

4. A degaussing apparatus, comprising:
   degaussing means for degaussing a color cathode ray tube provided with a deflection yoke supplied with a vertical deflection current having a constant amplitude and a constant frequency of M Hz, M being substantially an integer, said degaussing means erasing magnetism from a member which is formed of a magnetic material and is located in the color cathode ray tube; and
   degaussing signal source means for applying the degaussing means with a degaussing signal whose frequency is constant at L Hz simultaneously with the supplying of the vertical deflection current, said M and L being determined to effectuate said erasure by said degaussing means such that M/L is substantially not an integer, said degaussing signal being an alternating current, said degaussing signal being simultaneously supplied even when said vertical deflection current is not substantially zero.

5. A degaussing apparatus according to claim 4, wherein a part of the color cathode ray tube is located in said degaussing means, and said degaussing signal is an alternating current which attenuates gradually.

6. A degaussing apparatus according to claim 4, wherein said degaussing means moves away from a region close to the color cathode ray tube when the degaussing signal is supplied to the degaussing means.

7. A degaussing apparatus according to claim 4, wherein said M/L is in the range of $0.1 \leq M/L < 100$.

8. A color cathode ray tube apparatus comprising:
   a vacuum envelope including a panel, a funnel and a neck and having a tube axis, said panel having a faceplate whose front shape is substantially rectangular and which has an inner surface, the vacuum envelope also including a skirt extending from a peripheral portion of the faceplate, said funnel being bonded to the skirt, said neck being substantially cylindrical and continuous to the funnel;
   a phosphor screen formed on the inner surface of the faceplate;
   a shadow mask facing the phosphor screen of the faceplate;
   a deflection yoke, provided on the vacuum envelope, for generating a magnetic field by which to deflect an electron beam, said deflection yoke being supplied with a vertical deflection current having a constant amplitude and whose frequency is constant at M Hz, M being substantially an integer; and
   degaussing means, located around an outer surface of at least one of the funnel and the panel, for degaussing a member formed of a magnetic material to erase remnant magnetism therefrom, said degaussing means being supplied with a degaussing signal whose frequency is constant at L Hz simultaneously with the supplying of the vertical deflection current, said M and L being determined to effectuate said erasure of said remnant magnetism such that M/L is substantially not an integer, said degaussing signal being an alternating current which attenuates gradually, said degaussing signal being simultaneously supplied even when said vertical deflection current is not substantially zero.

9. A color cathode ray tube apparatus according to claim 8, wherein said M/L is in the range of $0.1 \leq M/L < 100$.

10. A color cathode ray tube apparatus according to claim 8, wherein said degaussing means includes a degaussing coil.

11. A color cathode ray tube apparatus according to claim 8, wherein said degaussing means is connected to degaussing signal source means for generating the degaussing signal.

12. A degaussing apparatus comprising:
   degaussing means for degaussing a color cathode ray tube having a deflection yoke that is supplied with a vertical deflection current having a constant amplitude and a constant frequency of M Hz, M being substantially an integer, said degaussing means erasing magnetism from a magnetic material member located in the color cathode ray tube; and
   degaussing signal source means for supplying an alternating current degaussing signal to said degaussing means simultaneously with the supply of said vertical deflection current to said deflection yoke, said degaussing signal having a constant frequency of L Hz, wherein M and L are determined to effectuate said erasure of said magnetism such that M/L is substantially not an integer, said degaussing signal being simultaneously supplied even when said vertical deflection current is not substantially zero.

13. A degaussing apparatus according to claim 12, wherein a part of the color cathode ray tube is located in said degaussing means, and said degaussing signal is an alternating current which attenuates over time.

14. A degaussing apparatus according to claim 12, wherein said degaussing means moves away from a region close to the color cathode ray tube when the degaussing signal is supplied to the degaussing means.

15. A method of degaussing a color cathode ray tube provided with a deflection yoke by using a degaussing coil, the tube comprising a vacuum envelope including a panel, a funnel, a neck and having a tube axis, and a shadow mask facing the panel, the deflection yoke being provided on the vacuum envelope for deflecting an electron beam, said method comprising the steps of:
supplying the deflection yoke with a vertical deflection current having a constant amplitude and whose frequency is constant at M Hz; and
supplying the degaussing coil with a degaussing signal whose frequency is constant at L Hz, simultaneously with supplying of the vertical deflection current, said M and L being determined to effectuate said degaussing such that M/L is substantially not an integer, said degaussing signal being an alternating current, said M/L being in the range of $0.1 \leq M/L < 100$, said degaussing signal being simultaneously supplied even when said vertical deflection current is not substantially zero.

16. A degaussing apparatus comprising:
degaussing means for degaussing a color cathode ray tube having a deflection yoke that is supplied with a vertical deflection current having a constant amplitude and a constant frequency of M Hz, said degaussing means erasing magnetism from a magnetic material member located in the color cathode ray tube; and
degaussing signal source means for supplying an alternating current degaussing signal to said degaussing means simultaneously with the supply of said vertical deflection current to said deflection yoke, said degaussing signal having a constant frequency of L Hz, wherein M and L are determined to effectuate said erasure of said magnetism such that M/L is substantially not an integer, said M/L being in the range of $0.1 \leq M/L < 100$, said degaussing signal being simultaneously supplied even when said vertical deflection current is not substantially zero.

* * * * *